T. C. COOPER.
STEERING WHEEL LOCK FOR AUTOMOBILES.
APPLICATION FILED OCT. 30, 1916.

1,300,820.

Patented Apr. 15, 1919.

Witness:
Leonard W. Novander

Inventor
Thomas C. Cooper
By George Bayard Jones
Atty

T. C. COOPER.
STEERING WHEEL LOCK FOR AUTOMOBILES.
APPLICATION FILED OCT. 30, 1916.
1,300,820.
Patented Apr. 15, 1919.
2 SHEETS—SHEET 2.
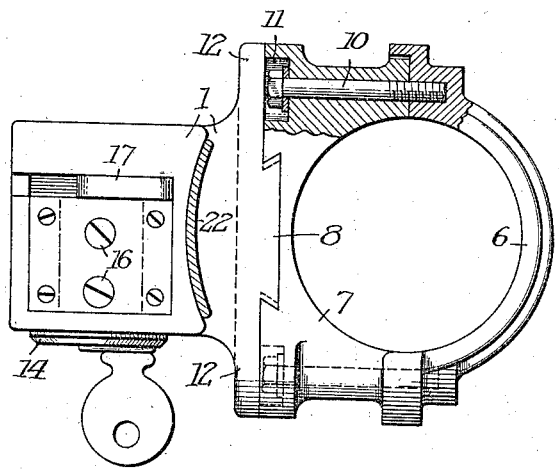
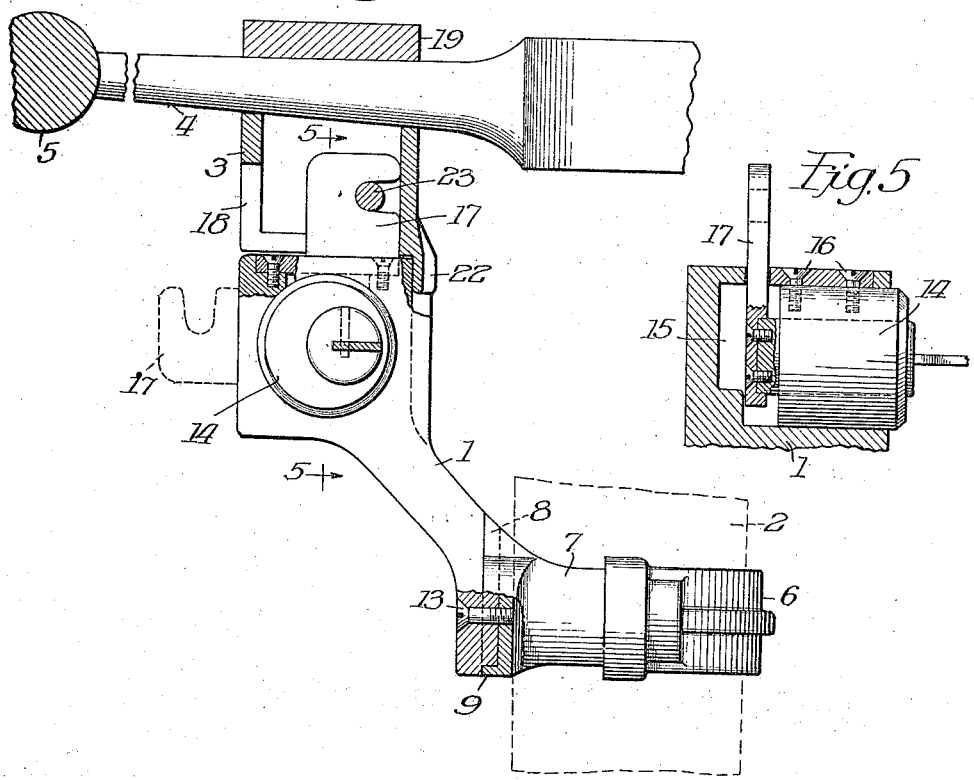
Witness:
Leonard W. Novander
Inventor
Thomas C. Cooper
By George Bayard Jones,
Atty

UNITED STATES PATENT OFFICE.

THOMAS C. COOPER, OF CHICAGO, ILLINOIS.

STEERING-WHEEL LOCK FOR AUTOMOBILES.

1,300,820.  Specification of Letters Patent.  Patented Apr. 15, 1919.

Application filed October 30, 1916. Serial No. 128,432.

*To all whom it may concern:*

Be it known that I, THOMAS C. COOPER, a citizen of the United States, residing at Chicago, in the county of Cook and State of Illinois, have invented a certain new and useful Improvement in Steering-Wheel Locks for Automobiles, of which the following is a full, clear, concise, and exact description.

My invention relates to improvements in locks for the steering wheels of automobiles.

The object of the invention is to provide a lock of rugged construction, having parts which so coöperate that when the steering wheel is locked to the post, the various parts of which the lock is composed, cannot be moved on their supports and cannot be separated to render the lock ineffective.

In the accompanying drawings I have illustrated the preferred embodiment of my invention.

Fig. 3 is a plan view of the lower part of the structure, with certain parts in section.

Fig. 4 is a side elevation, partly in section, of the complete lock.

Fig. 5 is a section on the line 5—5 of Fig. 4.

Figure 1:
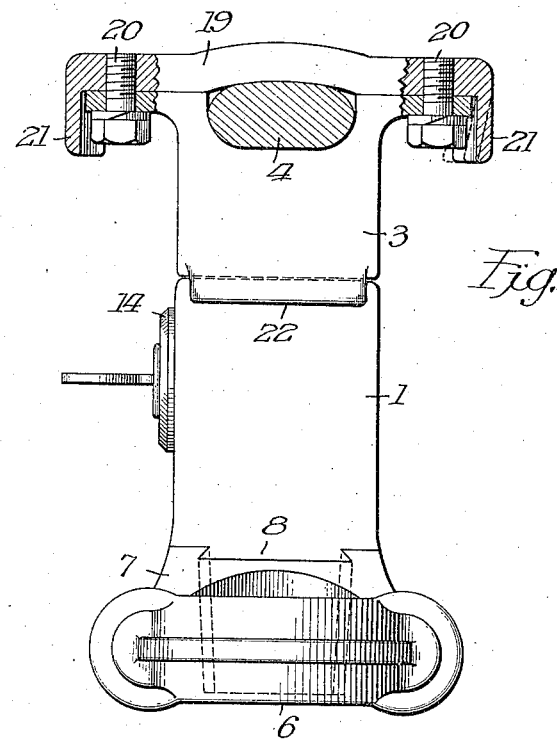
Figure 1 is a front elevation of the lock.
Figure 2:
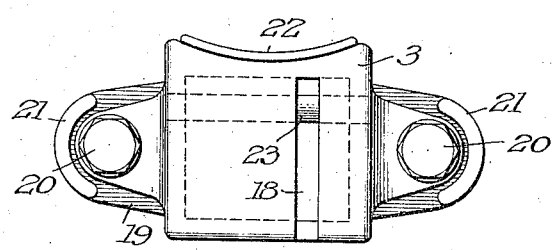
Fig. 2 is a bottom view of the upper part of the structure.

The lock is composed of two parts or members one of which, the lower part 1, is clamped about the steering post 2 and the other of which, the upper part 3, is clamped about one of the spokes 4 of the steering wheel 5. These members are of very rugged construction. The lower member is held in place by means of a clamp consisting of detachable parts 6, 7, said clamp as a whole having sliding engagement with the member 1 by virtue of the dove-tailed connection 8 shown particularly in Fig. 3. The engaging walls which constitute the dove-tail, converge downwardly as shown in Fig. 1, whereby downward movement of the part 1 with respect to the clamp 7 is limited. Said movement is also limited by a shoulder 9, (Fig. 4). The clamping parts 6, 7, are fastened together by studs 10, the heads of which are received within recesses 11. These recesses are covered by the flange 12 arranged at the lower end of the part 1. As a result it is impossible to gain access to said studs for the purpose of removing the clamp from the post unless the member 1 is first raised to expose the heads of said studs. Such movement is normally prevented by screws 13 or suitable equivalent fastening means. It is prevented more particularly however, when the wheel is locked by reason of the fact that the upper and lower members 1, 3 are in vertical alinement, the upper one obstructing upward movement of the lower one, as hereinafter explained more fully.

A lock 14 of any suitable type, such as a pin lock for example, is secured within a recess 15 provided in the enlarged upper end of the member 1. It is suitably held in place by a screw 16 or other fastening means. The tongue 17 is arranged to swing upwardly into a slot 18 in the lower end of the upper member 3, as indicated in dotted and full lines in Fig. 4. Said upper member is clamped to the spoke 4 by means of a clamp 19 secured by studs 20. In order to prevent unauthorized removal of said studs, the projecting flanges 21 may be bent over the heads of said studs, as indicated in Fig. 1. Said upper member is designed to fit the tapering spoke 4 whereby it cannot be driven toward the hub of the steering wheel, although it might be driven toward the rim of the steering wheel, if an attempt were made to steal the automobile, unless some means were provided to prevent such movement. The means which I have devised consists of a flange 22 which fits over the upper end of the member 1 as shown in Fig. 4, thereby effectually blocking any such unauthorized attempt to force the upper member toward the rim of the wheel. Said flange 22 is effective only when the upper and lower members are in vertical alinement and it is necessary to bring them into such alinement in order to lock them together. The locking tongue 17 fits over a pin 23, but it will be noted that the parts are locked by the mere introduction of said tongue into the slot, since rotation of the wheel is prevented thereby and since movement of the upper member radially outward is prevented and since movement of the lower member upwardly is prevented. In other words, unless the lock can be operated by means of a key or some equivalent, it is impossible to so manipulate the parts of which the lock is composed, as to destroy its effectiveness.

By virtue of the engagement of the notch in the tongue 17 with the pin 23, it will be seen that the clamping members about the steering post cannot be driven downwardly.

It will also be apparent that even if the clamp 19 is removed from the upper member in some manner, the lock will still be effective, since the spoke 4 rests in a recess in said upper member, which latter is thereby locked against movement.

It will be seen that I have produced a very rugged and effective lock which cannot be unlocked by an unauthorized party, except by the use of a duplicate key. The lock, furthermore, may be very quickly applied to any car, since the clamping members 6, 7 may be made up in various sizes adapted to fit any steering post and provided with the dove-tailed connection 8, whereby any clamp may be fitted to the same standard lower member 1. In order to prevent the clamps from marring the finished surface of the post or steering wheel spoke, felt pads or other lining may be used if desired.

It is obvious that the invention may be embodied in various different forms and therefore I do not limit myself to the structural details described herein, except where limitations appear in the appended claims.

Having thus described my invention, what I claim as new and desire to secure by Letters Patent of the United States is:

1. A device of the class described comprising a steering wheel clamp, a steering post clamp, and an intermediate member arranged directly beneath said steering wheel clamp whereby upward movement thereof is obstructed by said steering wheel clamp, said intermediate member being provided with locking means adapted to engage said steering wheel clamp and having a dove-tail connection with said steering post clamp, the walls of said dove-tail connection converging, thereby forming means whereby said intermediate member is limited in its movement in one direction beyond a predetermined position.

2. A steering wheel lock comprising a post clamp, a steering wheel clamp and an intermediate member provided with a lock chamber, said intermediate member having a dove-tailed connection with said post clamp to bring said lock chamber into vertical alinement with said steering wheel clamp and to limit the movement of said intermediate member in a vertical direction, means to secure said steering wheel clamp about the spoke of a steering wheel, means for preventing access to said securing means when said steering wheel clamp and said intermediate member are locked, means to hold said post clamp in position, and means on the lower end of said intermediate member adapted to coöperate with said post clamp to prevent the removal of said holding means when said intermediate member is wedged into position.

3. A steering wheel locking device comprising in combination a multiple part steering post clamp having means for securing the parts together and a recess in one of said parts; a steering wheel clamp mounted on a spoke of said wheel; an intermediate member having a portion adapted to slide in the recess in said steering post clamp and to cover the said securing means; means for limiting the downward movement of said intermediate member with respect to the steering post clamp, said steering wheel clamp locking said intermediate member in said steering post clamp when said steering wheel clamp is brought into alinement with said intermediate member; a key - controlled tongue and slot-lock for locking the steering wheel clamp and the intermediate member; said intermediate member and said steering wheel clamp having overlapping means permitting rotation of the steering wheel clamp with the wheel with respect to said intermediate member but preventing said steering wheel clamp from being moved radially outward on said wheel when said members are in alinement.

In witness whereof, I, hereunto subscribe my name this 28th day of October, A. D. 1916.

THOMAS C. COOPER.

Copies of this patent may be obtained for five cents each, by addressing the "Commissioner of Patents, Washington, D. C."